US012586331B2

(12) United States Patent
Lu et al.

(10) Patent No.: US 12,586,331 B2
(45) Date of Patent: Mar. 24, 2026

(54) SYSTEM AND METHOD FOR CHANGING OVERALL STYLE OF PUBLIC AREA BASED ON VIRTUAL

(71) Applicant: SHANGHAI JIAO TONG UNIVERSITY, Shanghai (CN)

(72) Inventors: Shaoming Lu, Shanghai (CN); Zhou Li, Shanghai (CN); Ziyu Song, Shanghai (CN)

(73) Assignee: SHANGHAI JIAO TONG UNIVERSITY, Shanghai (CN)

( * ) Notice: Subject to any disclaimer, the term of this patent is extended or adjusted under 35 U.S.C. 154(b) by 236 days.

(21) Appl. No.: 18/381,640

(22) Filed: Oct. 19, 2023

(65) Prior Publication Data

US 2024/0078775 A1 Mar. 7, 2024

Related U.S. Application Data

(63) Continuation of application No. PCT/CN2023/100322, filed on Jun. 15, 2023.

(30) Foreign Application Priority Data

Sep. 2, 2022 (CN) .......................... 202211070865.6

(51) Int. Cl.
*G06T 19/00* (2011.01)
*G06T 19/20* (2011.01)

(52) U.S. Cl.
CPC ............ *G06T 19/20* (2013.01); *G06T 19/003* (2013.01); *G06T 2200/24* (2013.01); *G06T 2210/04* (2013.01); *G06T 2219/2024* (2013.01)

(58) Field of Classification Search
None
See application file for complete search history.

(56) References Cited

U.S. PATENT DOCUMENTS

| | | | |
|---|---|---|---|
| 11,575,676 B1 * | 2/2023 | Banks ..................... | G06T 11/00 |
| 2009/0299960 A1 * | 12/2009 | Lineberger .............. | A63F 13/60 |
| 2010/0094696 A1 * | 4/2010 | Molinelli ........... | G06Q 30/0214 |
| | | | 715/224 |

(Continued)

FOREIGN PATENT DOCUMENTS

| | | |
|---|---|---|
| CN | 106249607 A | 12/2016 |
| CN | 206039650 U | 3/2017 |

(Continued)

*Primary Examiner* — Martin Mushambo
(74) *Attorney, Agent, or Firm* — Bayramoglu Law Offices

(57) ABSTRACT

A system and method for changing an overall style of a public area based on a virtual scene are provided. The system includes: an information storage module configured to store user profile information, user interaction and operation information, and interior style information on a computer host or a cloud server; a scene rendering module configured to obtain data in the information storage module and present panorama information of a public area to a user through a real-time rendering system; a style interaction module configured to change overall style information attached to a structure to implement ideas of different users for the public area in real time; and a control module configured to change and record style information in a virtual scene and provide roaming experience in the public area.

8 Claims, 6 Drawing Sheets

(56)  References Cited

U.S. PATENT DOCUMENTS

| | | | |
|---|---|---|---|
| 2013/0129210 A1* | 5/2013 | Na | G06V 40/168 |
| | | | 382/165 |
| 2014/0176607 A1* | 6/2014 | Yang | G06T 19/20 |
| | | | 345/633 |
| 2016/0179297 A1* | 6/2016 | Lundin | G06F 3/14 |
| | | | 715/744 |
| 2017/0262247 A1* | 9/2017 | Yoganandan | G06F 3/1438 |
| 2018/0039621 A1* | 2/2018 | Sconce | G06F 3/04817 |
| 2018/0068474 A1* | 3/2018 | Mowatt | G06F 3/012 |
| 2019/0164340 A1 | 5/2019 | Bavastro | |
| 2019/0188773 A1* | 6/2019 | Chu | G06V 20/53 |
| 2019/0287152 A1* | 9/2019 | Adoni | G06Q 30/0631 |
| 2019/0311538 A1* | 10/2019 | Vadakkeveedu | G06T 17/05 |
| 2019/0332946 A1* | 10/2019 | Han | G06N 5/022 |
| 2020/0242849 A1* | 7/2020 | Cini | G06T 17/00 |
| 2021/0019453 A1* | 1/2021 | Yang | G06N 3/045 |
| 2021/0026998 A1* | 1/2021 | Hoppe | H04L 65/403 |
| 2021/0365602 A1* | 11/2021 | Gifford | G06T 17/00 |
| 2022/0319108 A1* | 10/2022 | Jagannathan | G06Q 30/0641 |
| 2022/0335641 A1* | 10/2022 | Fantegrossi | G06V 40/103 |
| 2023/0125988 A1* | 4/2023 | Lee | G06F 30/13 |
| | | | 703/1 |
| 2023/0128740 A1* | 4/2023 | Hong | G06F 30/13 |
| | | | 703/1 |

FOREIGN PATENT DOCUMENTS

| | | |
|---|---|---|
| CN | 107657551 A | 2/2018 |
| CN | 107832370 A | 3/2018 |
| CN | 110060350 A | 7/2019 |
| CN | 111046454 A | 4/2020 |
| CN | 111079222 A | 4/2020 |
| CN | 111292409 A | 6/2020 |
| CN | 115374520 A | 11/2022 |
| WO | 2019058266 A1 | 3/2019 |

* cited by examiner

PC-side interaction interface

VR-side interaction interface

1

SYSTEM AND METHOD FOR CHANGING OVERALL STYLE OF PUBLIC AREA BASED ON VIRTUAL

CROSS REFERENCE TO THE RELATED APPLICATIONS

This application is a continuation application of International Application No. PCT/CN2023/100322, filed on Jun. 15, 2023, which is based upon and claims priority to Chinese Patent Application No. 202211070865.6, filed on Sep. 2, 2022, the entire contents of which are incorporated herein by reference.

TECHNICAL FIELD

The present disclosure relates to the technical field of virtual reality (VR), and in particular, to a system and method for changing an overall style of a public area based on a virtual scene.

BACKGROUND

At present, many real-time rendering platforms in the field of architecture mainly provide roaming experience. It is not possible to change the overall style of existing architectural design and record related information to evaluate and further improve the design. Consequently, the design on the platforms can only be viewed without further effect.

Chinese patent CN111079222A (application number: CN201911361755.3) discloses a VR-based virtual architecture system, including an unreal engine. An output end of the unreal engine is electrically connected to an input end of the virtual architecture system through a wire. The virtual architecture system includes a change module, an operation interface library, and a data acquisition module. An output end of the data acquisition module is electrically connected to an input end of a display module through a wire. The input end of the display module is electrically connected to an output end of a multimedia playing module through a wire. Although the patent can provide a real-life architectural experience through a real-time rendering platform based on VR, the patent remains only at the appreciation stage and cannot help with architectural design, especially overall interior style design.

SUMMARY

In view of defects in the prior art, an objective of the present disclosure is to provide a system and method for changing an overall style of a public area based on a virtual scene.

A system for changing an overall style of a public area based on a virtual scene provided in the present disclosure includes:

an information storage module configured to store user profile information, user interaction and operation information, and interior style information on a computer host or a cloud server;

a scene rendering module configured to obtain data in the information storage module and present panorama information of a public area to a user through a real-time rendering system;

a style interaction module configured to change overall style information attached to a structure to implement ideas of different users for the public area in real time; and

a control module configured to change and record style information in a virtual scene and provide roaming experience in the public area.

Further, the information storage module includes:

a user profile basic information module configured to acquire and store basic information of the user, including user number, age, gender, occupation, and income information; record a related operation of the user; and acquire and record a preferred style selected by the user in the operation;

a spatial component information module configured to acquire and store immutable structural information in the public area, including three-dimensional material property, function, and semantic information of a floor, a wall, a stair, and a roof; and a style information storage module configured to store a change made by the user to style information of the public area together with the basic information of the user for design optimization by a designer.

Further, the scene rendering module includes: a display rendering module corresponding to a computer side and a VR rendering module corresponding to a VR glasses side.

Further, the style interaction module includes:

a user interface (UI) interaction module, including a UI and a mouse or a VR handle, and configured to change overall style information of the public area; and a style library module configured to store various styles available to replace existing style information of the public area.

Further, the control module includes: a keyboard and mouse control module corresponding to a computer side and a VR handle control module corresponding to a VR glasses side.

A method for changing an overall style of a public area based on a virtual scene provided in the present disclosure includes:

information storage: storing user profile information, user interaction and operation information, and interior style information on a computer host or a cloud server;

scene rendering: obtaining stored information data and presenting panorama information of a public area to a user through a real-time rendering system;

style interaction: changing overall style information attached to a structure to implement ideas of different users for the public area in real time; and controlling: changing and recording style information in a virtual scene and providing roaming experience in the public area.

Preferably, the information storage includes:

user profile information storage: acquiring and storing basic information of the user, including user number, age, gender, occupation, and income information; recording a related operation of the user; and acquiring and recording a preferred style selected by the user in the operation;

spatial component information storage: acquiring and storing immutable structural information in the public area, including three-dimensional material property, function, and semantic information of a floor, a wall, a stair, and a roof; and style information storage: storing a change made by the user to style information of the public area together with the basic information of the user for design optimization by a designer.

Further, the scene rendering includes: performing display rendering on a computer side and VR rendering on a VR glasses side.

Further, the style interaction includes: changing overall style information of the public area through a UI and a mouse or a VR handle; and storing various overall style information of the public area in a style library available to replace existing style information of the public area.

Further, the controlling includes: performing controlling through a keyboard and a mouse on a computer side, performing controlling through a VR handle on a VR glasses side, and providing roaming experience in the public area.

BRIEF DESCRIPTION OF THE DRAWINGS

Other features, objectives, and advantages of the present disclosure will become more apparent by reading the detailed description of non-limiting embodiments with reference to the following drawings.

FIG. 3B shows a PC-side interaction interface in FIG. 3A, and FIG. 3C shows a VR-side interaction interface in FIG. 3A.

DETAILED DESCRIPTION OF THE EMBODIMENTS

The present disclosure is described in detail below with reference to specific embodiments. The following embodiments will help those skilled in the art further understand the present disclosure, but will not limit the present disclosure in any way. It should be noted that several variations and improvements can also be made by a person of ordinary skill in the art without departing from the conception of the present disclosure. These all fall within the protection scope of the present disclosure.

Figure 1:
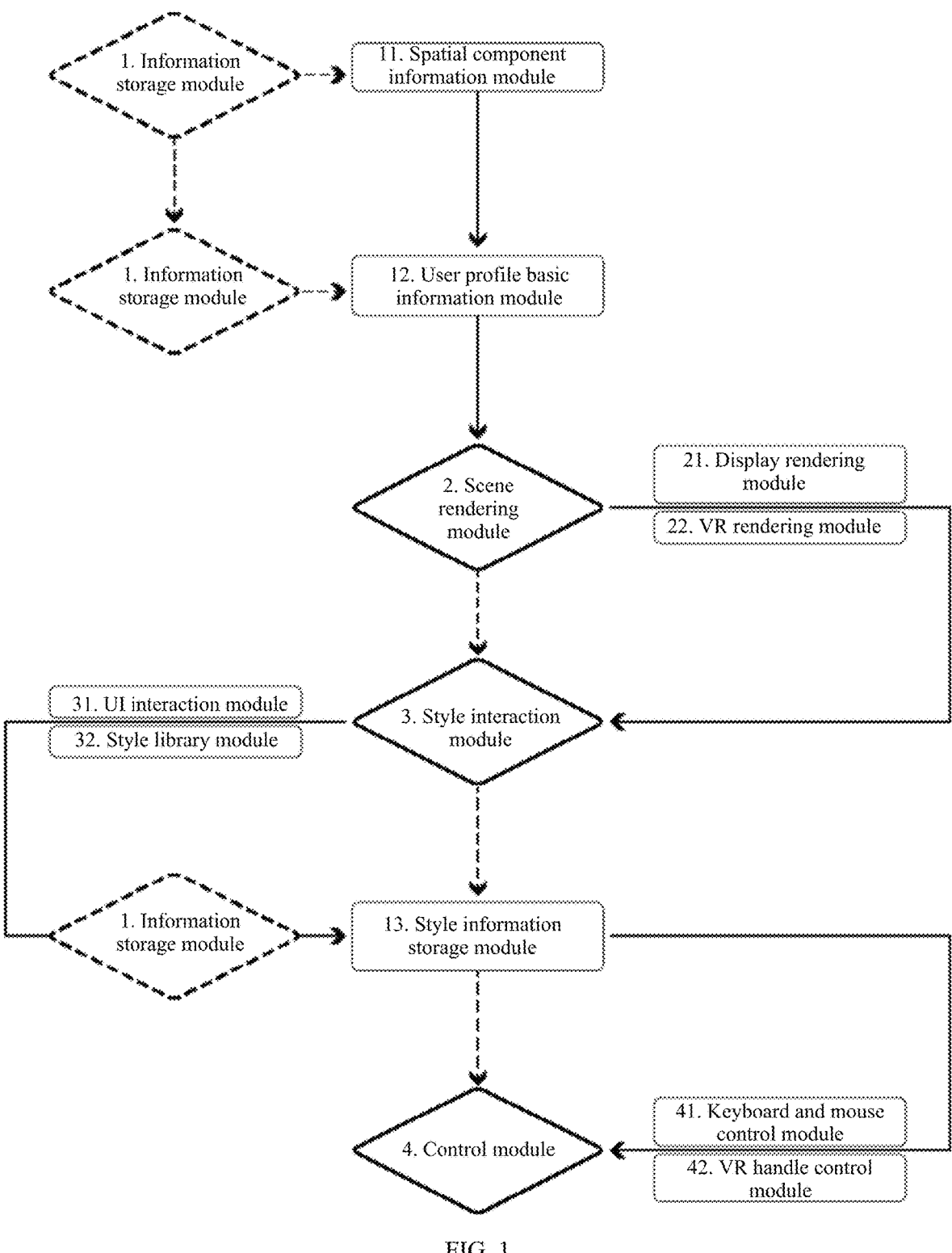
FIG. 1 is a schematic structural diagram of a system according to the present disclosure.
Figure 2:
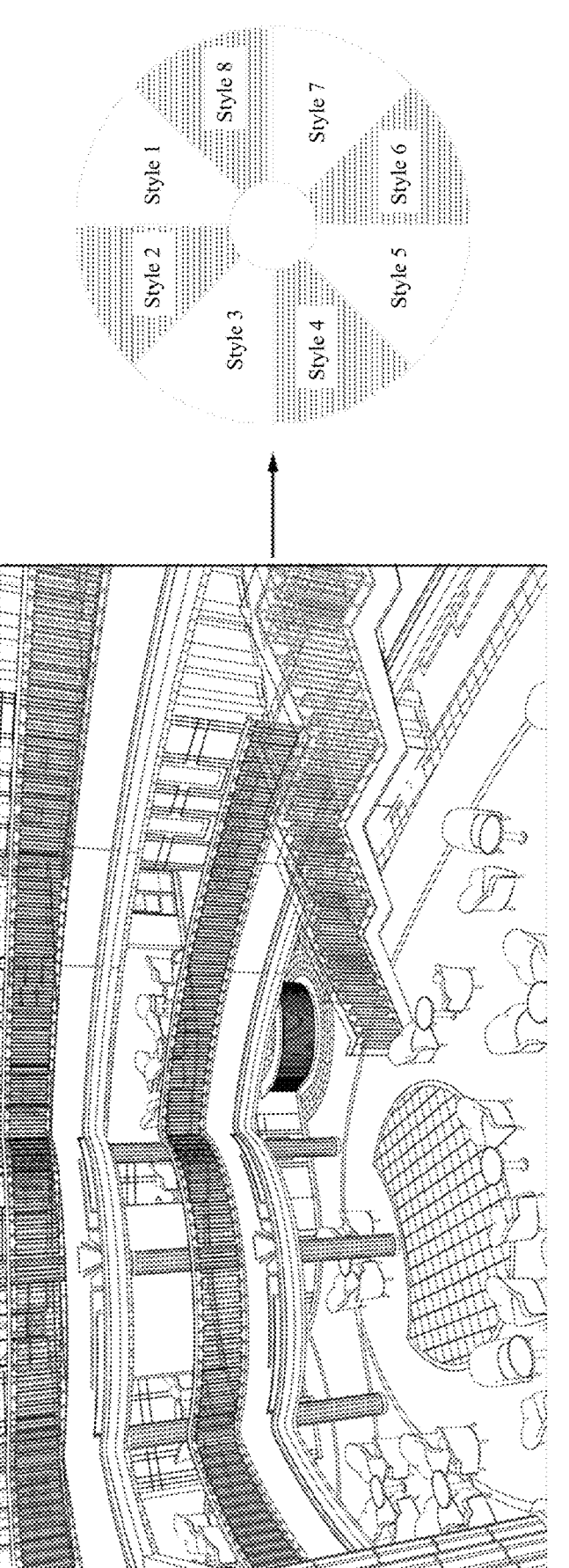
FIG. 2 is a schematic structural diagram of a style interaction module.
Figure 3A:
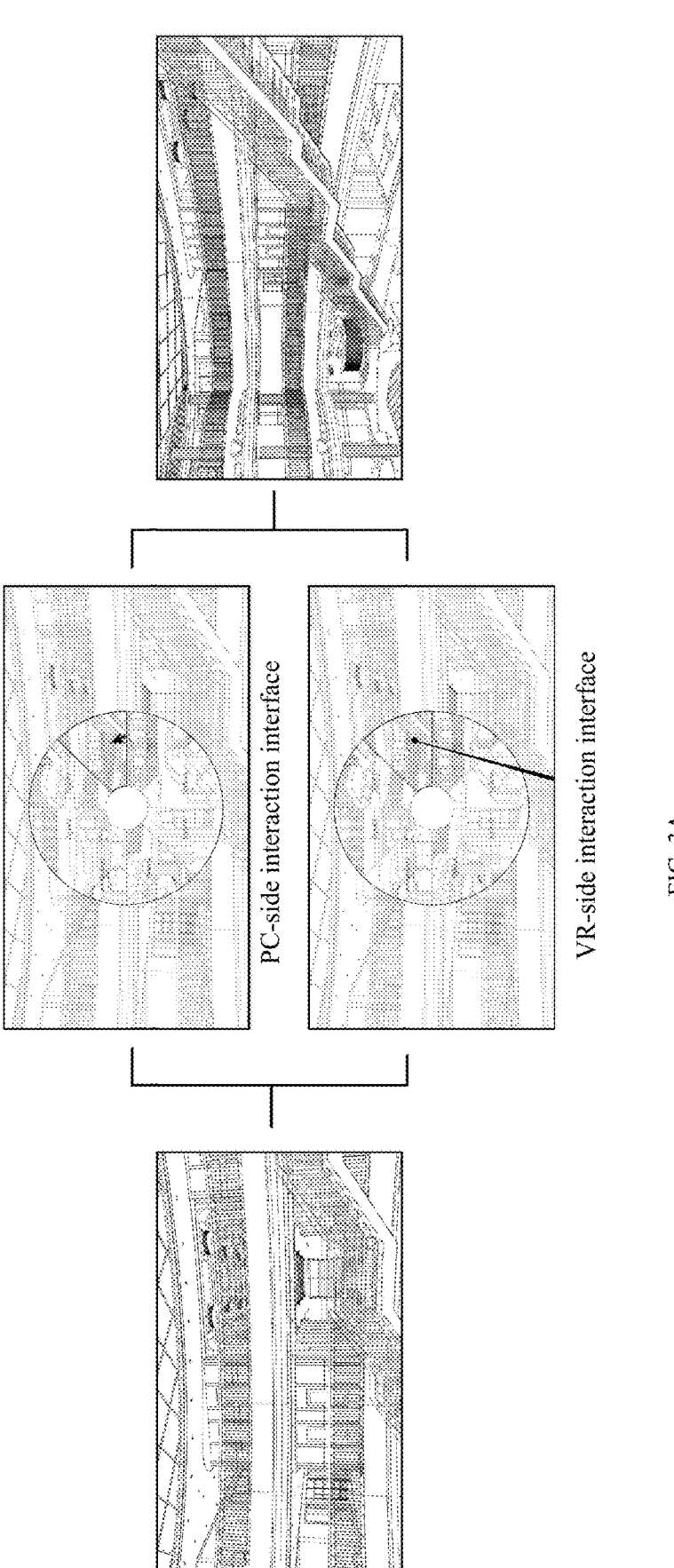
FIGS. 3A-3C show a schematic diagram of UIs of a style interaction module, where
Figure 3B:
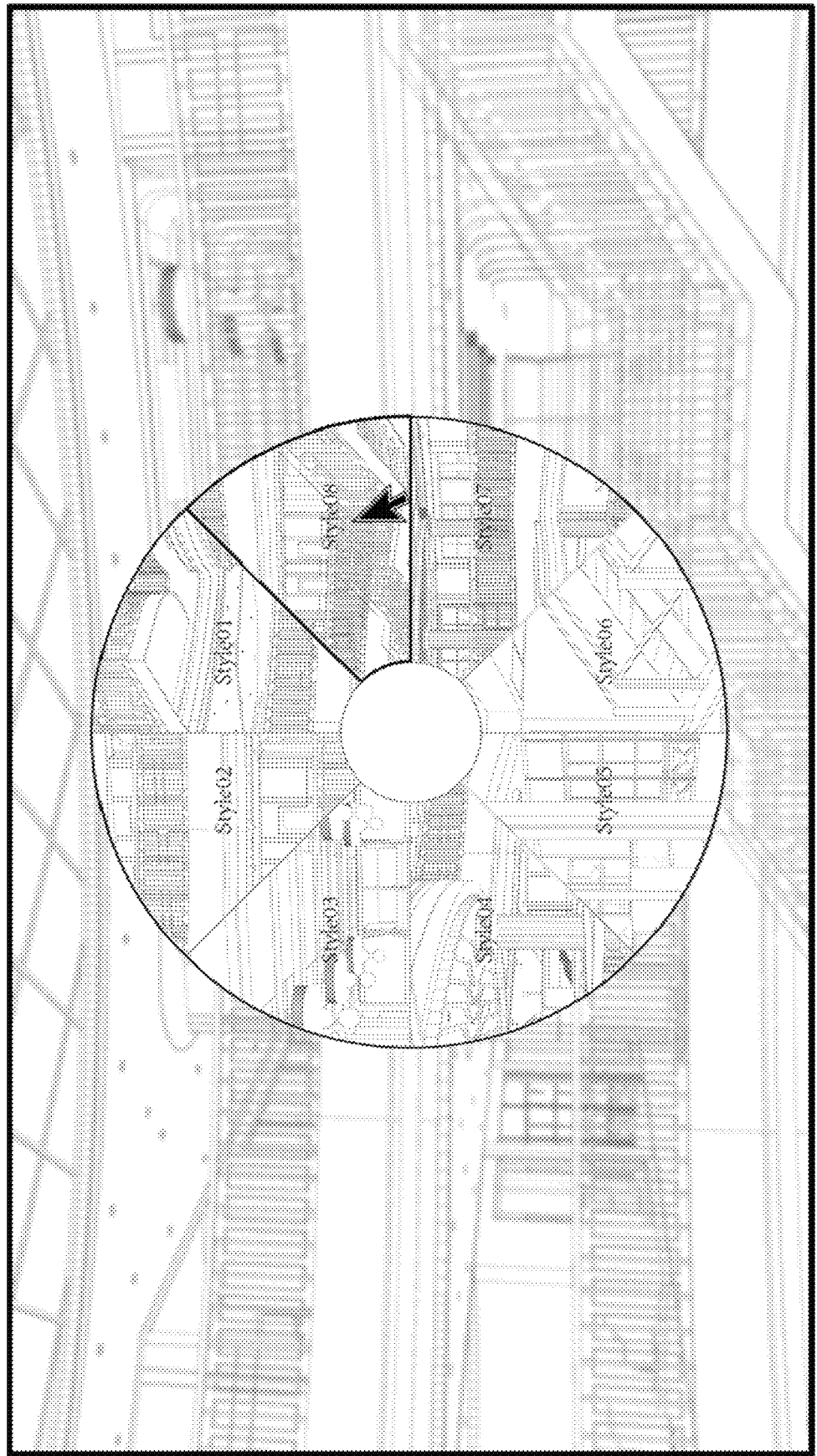
Figure 3C:
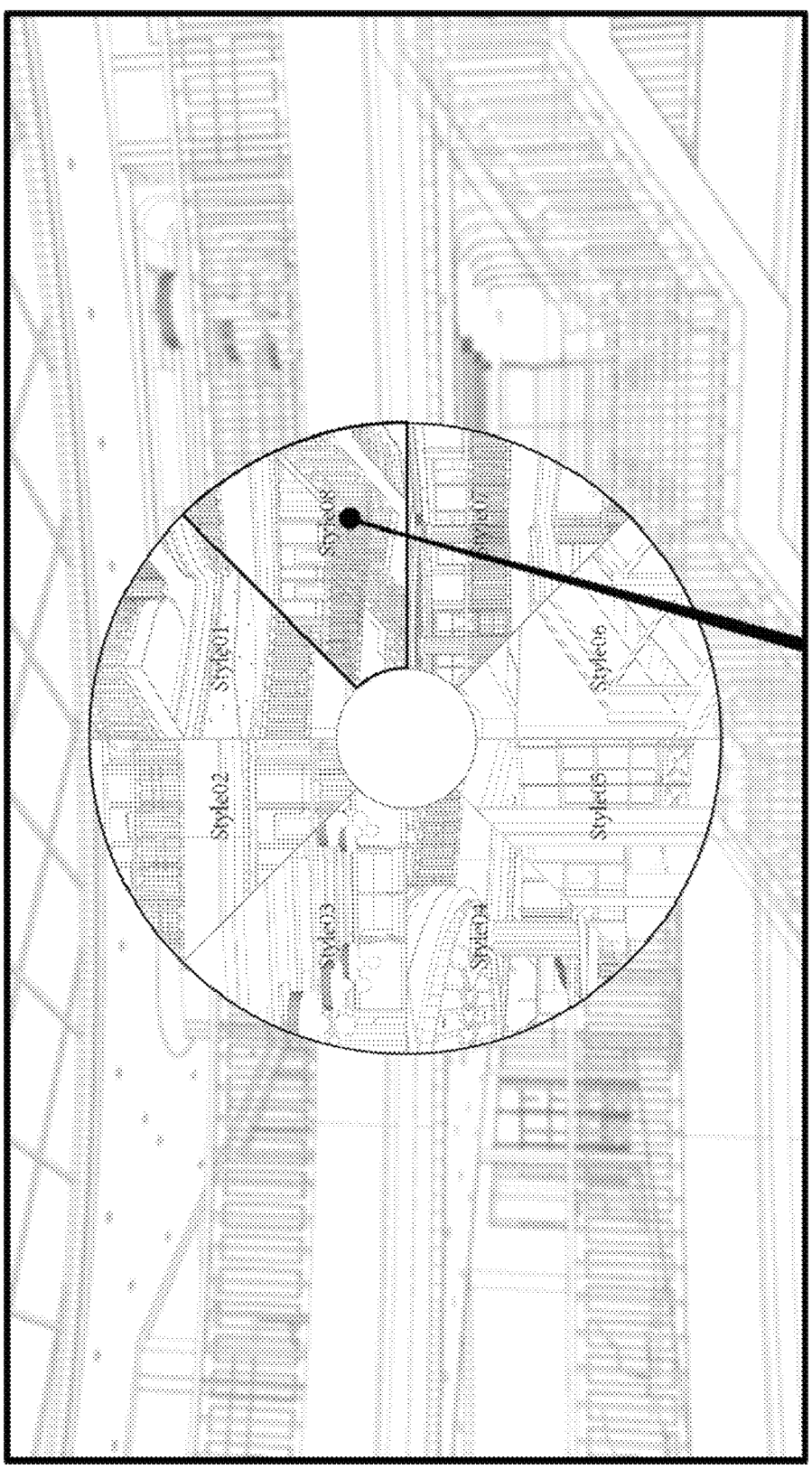

Embodiment:

An objective of the present disclosure is to provide a method and intelligent system for changing an overall style of a public area based on a virtual scene to overcome defects of existing user architectural experience and designer architectural design in an overall style. Relying on a VR scene and an interaction technology, the present disclosure provides an owner, a user, and an architect with overall architectural style experience, evaluation, and optimization at a design stage. To achieve the foregoing objective, the present disclosure provides a system for changing an overall style of a public area based on a virtual scene, as shown in FIG. 1, including:

an information storage module configured to store user profile information, user interaction and operation information, and interior style information;

a scene rendering module configured to obtain data in a spatial component information module and present panorama information of a public area of a cruise ship and building to a user through a real-time rendering system;

a style interaction module configured to change overall style information attached to structural information, to conveniently implement ideas of different users for the public area of the cruise ship and building in real time; and a control module configured to change and record style information in a scene and provide roaming experience in the public area of the cruise ship and building.

The information storage module includes:

a user profile basic information module configured to acquire and store basic information of the user, including user number, age, gender, occupation, and income information, record a related operation of the user, and acquire and record a preferred style selected by the user in the operation;

a spatial component information module configured to acquire and store immutable structural information in the cruise ship and building, including three-dimensional material property, function, and semantic information of architectural design foundations such as a floor, wall, stair, and roof; and a style information storage module configured to store a change made by the user to style information of the public area of the cruise ship and building together with the basic information of the user for further design optimization by a designer.

The scene rendering module includes:

a display rendering module corresponding to a platform system on a computer side and a VR rendering module corresponding to a platform system on a VR glasses side.

As shown in FIG. 2 and FIGS. 3A-3C, the style interaction module includes an UI interaction module and a style library module.

The UI interaction module includes UI design and a mouse or VR handle operation, and is configured to change overall style information of the public area. A UI includes a blurred background and a style wheel. On a PC-side interface, the user replaces existing style information by clicking the wheel through a keyboard and a mouse. On a VR-side interface, the user controls a blue line in a visual scene through the handle to click the style wheel to select preferred style information.

Figure 4:
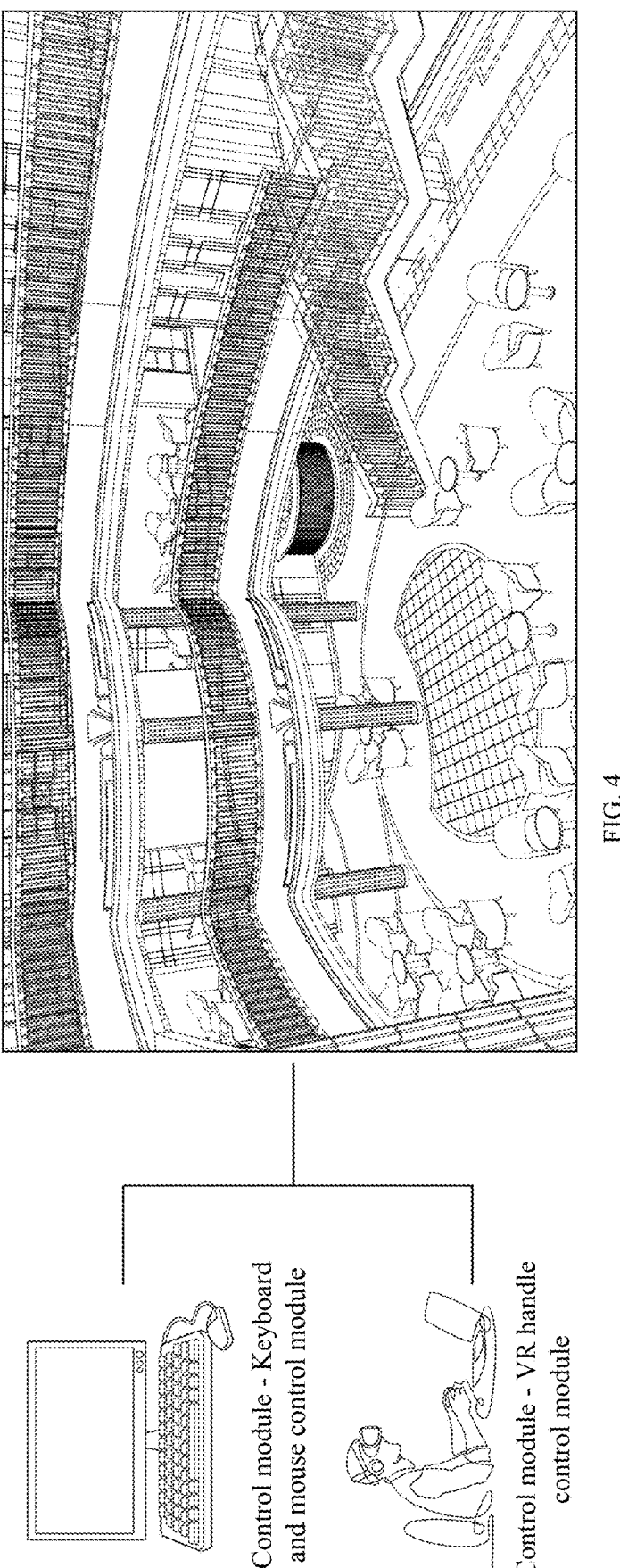
FIG. 4 is a schematic structural diagram of a control module.

The style library module is configured to store various styles available to replace existing style information of the public area of the cruise ship and building. As shown in FIG. 4, the control module includes:

a keyboard and mouse control module corresponding to the platform system on the computer side and a VR handle control module corresponding to the platform system on the VR glasses side.

The information storage module is a computer host or a cloud server.

A device used by the VR handle control module in the control module is HTC VIVE PRO and is connected through a DisplayPort (DP) signal line.

The present disclosure provides a method for changing an overall style of a public area based on a virtual scene, including: Information storage: User profile information, user interaction and operation information, and interior style information are stored on a computer host or a cloud server. Scene rendering: Stored information data is obtained and panorama information of a public area is presented to a user through a real-time rendering system. Style interaction: Overall style information attached to a structure is changed to implement ideas of different users for the public area in real time. Controlling: Style information in a virtual scene is changed and recorded and roaming experience in the public area is provided.

The information storage includes: User profile information storage: Basic information of the user is acquired and stored, including user number, age, gender, occupation, and income information; a related operation of the user is recorded; and a preferred style selected by the user in the operation is acquired and recorded. Spatial component information storage: Immutable structural information in the public area is acquired and stored, including three-dimensional material property, function, and semantic information of a floor, a wall, a stair, and a roof. Style information storage: A change made by the user to style information of the public area is stored together with the basic information of the user for design optimization by a designer. The scene rendering includes: Display rendering is performed on a computer side and VR rendering is performed on a VR glasses side. The style interaction includes: A style wheel on a UI is clicked to change overall style information of the public area through the UI and a mouse or a VR handle; and various overall style information of the public area is stored in a style library available to replace existing style information of the public area. The controlling includes: Controlling is performed through a keyboard and a mouse on a computer side, controlling is performed through a VR handle on a VR glasses side, and roaming experience in the public area is provided.

Those skilled in the art are aware that in addition to being realized by using pure computer-readable program code, the system, the apparatus, and each module thereof provided in the present disclosure can realize a same program in a form of a logic gate, a switch, an application-specific integrated circuit, a programmable logic controller, or an embedded microcontroller by performing logic programming on the method steps. Therefore, the system, the apparatus, and each module thereof provided in the present disclosure can be regarded as a kind of hardware component. The module included therein for realizing each program can also be regarded as a structure in the hardware component; and the module for realizing each function can also be regarded as a software program for implementing the method or a structure in the hardware component.

Compared with the prior art, the present disclosure has following beneficial effects:

(1) The present disclosure breaks a barrier between an interior designer and a user through a technology of virtual rendering interaction, and simulates roaming experience of the user in an internal scene before a product is put into use. In the roaming scene, the user can perform an interactive operation based on a preference of the user to change an overall style.

(2) An overall style of the cruise ship and building interactively selected by the user and recorded by the style information storage module in the present disclosure can provide a reference for an owner and the designer, reduce costs of communication among the owner, the designer, and the user, and make feedback real-time and efficient. Further, design is optimized to obtain a space more in line with the preference of the user, and accurately and quickly adapt to changing requirements of the market.

The specific examples of the present disclosure are described above. It should be understood that the present disclosure is not limited to the above specific implementations, and a person skilled in the art can make various variations or modifications within the scope of the claims without affecting the essence of the present disclosure. The examples of the present disclosure and features in the examples may be arbitrarily combined with each other in a non-conflicting situation.

What is claimed is:

1. A system for changing an overall style of a public area based on a virtual scene, comprising:

an information storage module configured to store user profile information, user interaction and operation information, and interior style information on a computer host or a cloud server;

a scene rendering module configured to obtain data in the information storage module and present panorama information of a public area to a user through a real-time rendering system;

a style interaction module configured to change overall style information attached to a structure to implement ideas of different users for the public area in real time; and a control module configured to change and record style information in a virtual scene and provide a roaming experience in the public area, wherein the information storage module comprises:

a user profile basic information module configured to acquire and store basic information of the user, comprising user number, age, gender, occupation, and income information; record a related operation of the user; and acquire and record a preferred style selected by the user in the operation;

a spatial component information module configured to acquire and store immutable structural information in the public area, comprising three-dimensional material property, function, and semantic information of a floor, a wall, a stair, and a roof; and a style information storage module configured to store a change made by the user to style information of the public area together with the basic information of the user for a design optimization by a designer.

2. The system for changing the overall style of the public area based on the virtual scene according to claim 1, wherein the scene rendering module comprises a display rendering module corresponding to a computer side and a virtual reality (VR) rendering module corresponding to a VR glasses side.

3. The system for changing the overall style of the public area based on the virtual scene according to claim 1, wherein the style interaction module comprises:

a user interface (UI) interaction module, comprising a UI and a mouse or a VR handle, and configured to change overall style information of the public area; and a style library module configured to store various styles available to replace existing style information of the public area.

4. The system for changing the overall style of the public area based on the virtual scene according to claim 1, wherein the control module comprises a keyboard and mouse control module corresponding to a computer side and a VR handle control module corresponding to a VR glasses side.

5. A method for changing an overall style of a public area based on a virtual scene, comprising:

information storage: storing user profile information, user interaction and operation information, and interior style information on a computer host or a cloud server;

scene rendering: obtaining stored information data and presenting panorama information of a public area to a user through a real-time rendering system;

style interaction: changing overall style information attached to a structure to implement ideas of different users for the public area in real time; and controlling: changing and recording style information in a virtual scene and providing a roaming experience in the public area, wherein the information storage comprises:

user profile information storage: acquiring and storing basic information of the user, comprising user number, age, gender, occupation, and income information; recording a related operation of the user; and acquiring and recording a preferred style selected by the user in the operation;

spatial component information storage: acquiring and storing immutable structural information in the public area, comprising three-dimensional material property, function, and semantic information of a floor, a wall, a stair, and a roof; and style information storage: storing a change made by the user to style information of the public area together with the basic information of the user for a design optimization by a designer.

6. The method for changing the overall style of the public area based on the virtual scene according to claim 5, wherein the scene rendering comprises: performing display rendering on a computer side and VR rendering on a VR glasses side.

7. The method for changing the overall style of the public area based on the virtual scene according to claim 5, wherein the style interaction comprises: changing overall style information of the public area through a UI and a mouse or a VR handle; and storing various overall style information of the public area in a style library available to replace existing style information of the public area.

8. The method for changing the overall style of the public area based on the virtual scene according to claim 5, wherein the step of controlling comprises: performing controlling through a keyboard and a mouse on a computer side, performing controlling through a VR handle on a VR glasses side, and providing the roaming experience in the public area.

* * * * *